Jan. 25, 1927.
J. DENARO
1,615,799
AUTOMATIC MACHINE FOR MAKING CUP PASTRY
Filed Dec. 28, 1925    8 Sheets-Sheet 1
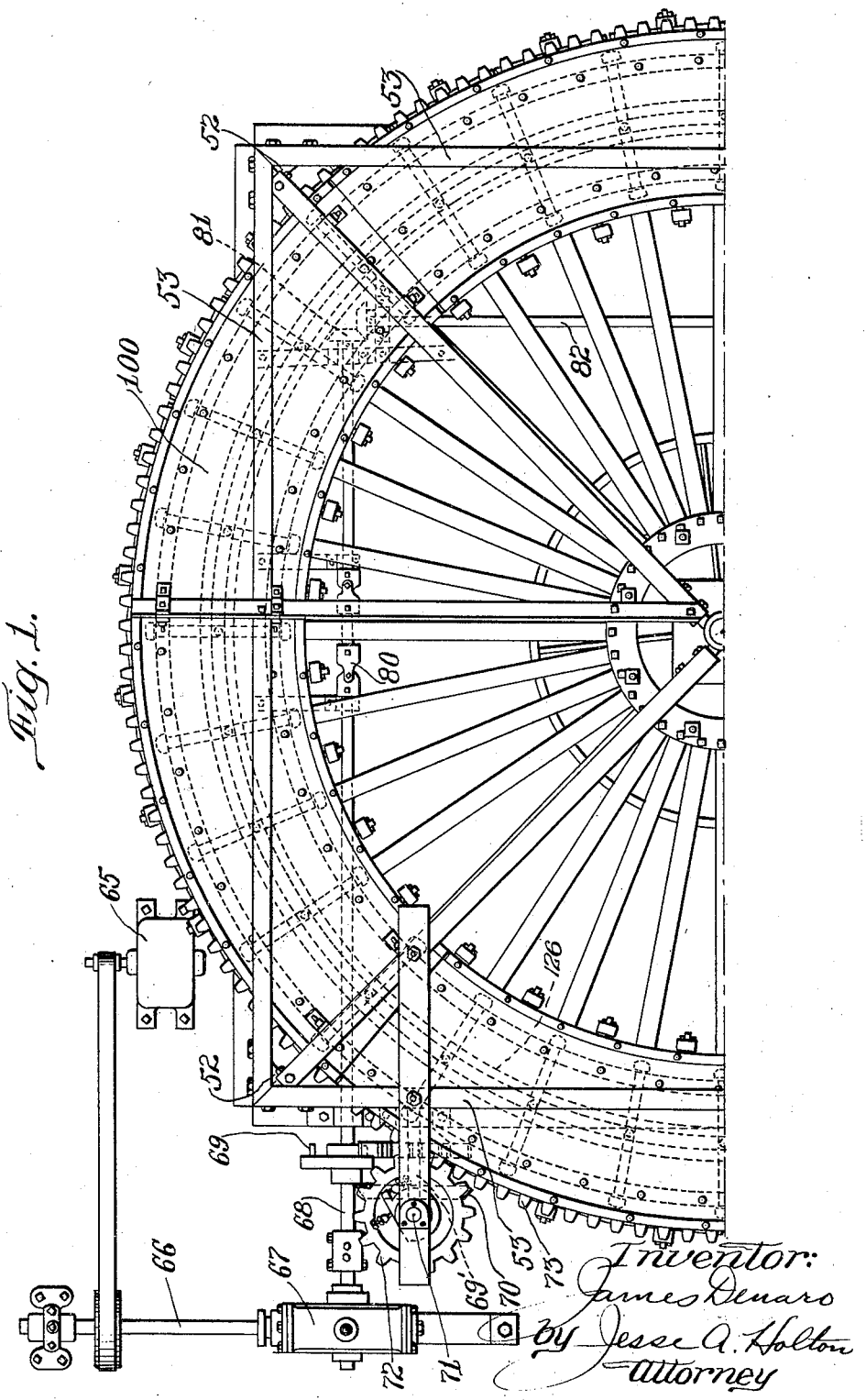

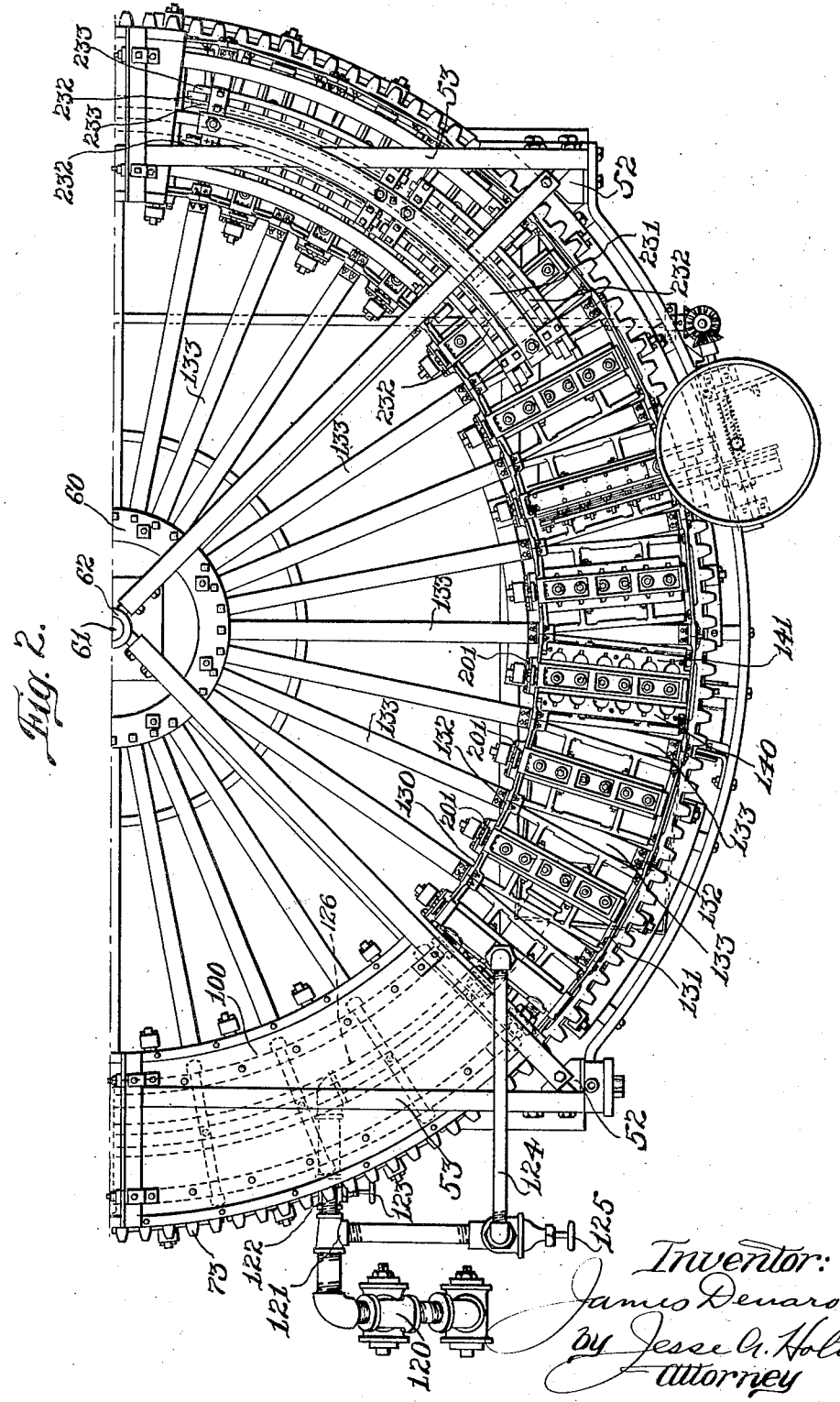

Jan. 25, 1927.  
J. DENARO  
1,615,799  
AUTOMATIC MACHINE FOR MAKING CUP PASTRY  
Filed Dec. 28, 1925    8 Sheets-Sheet 3
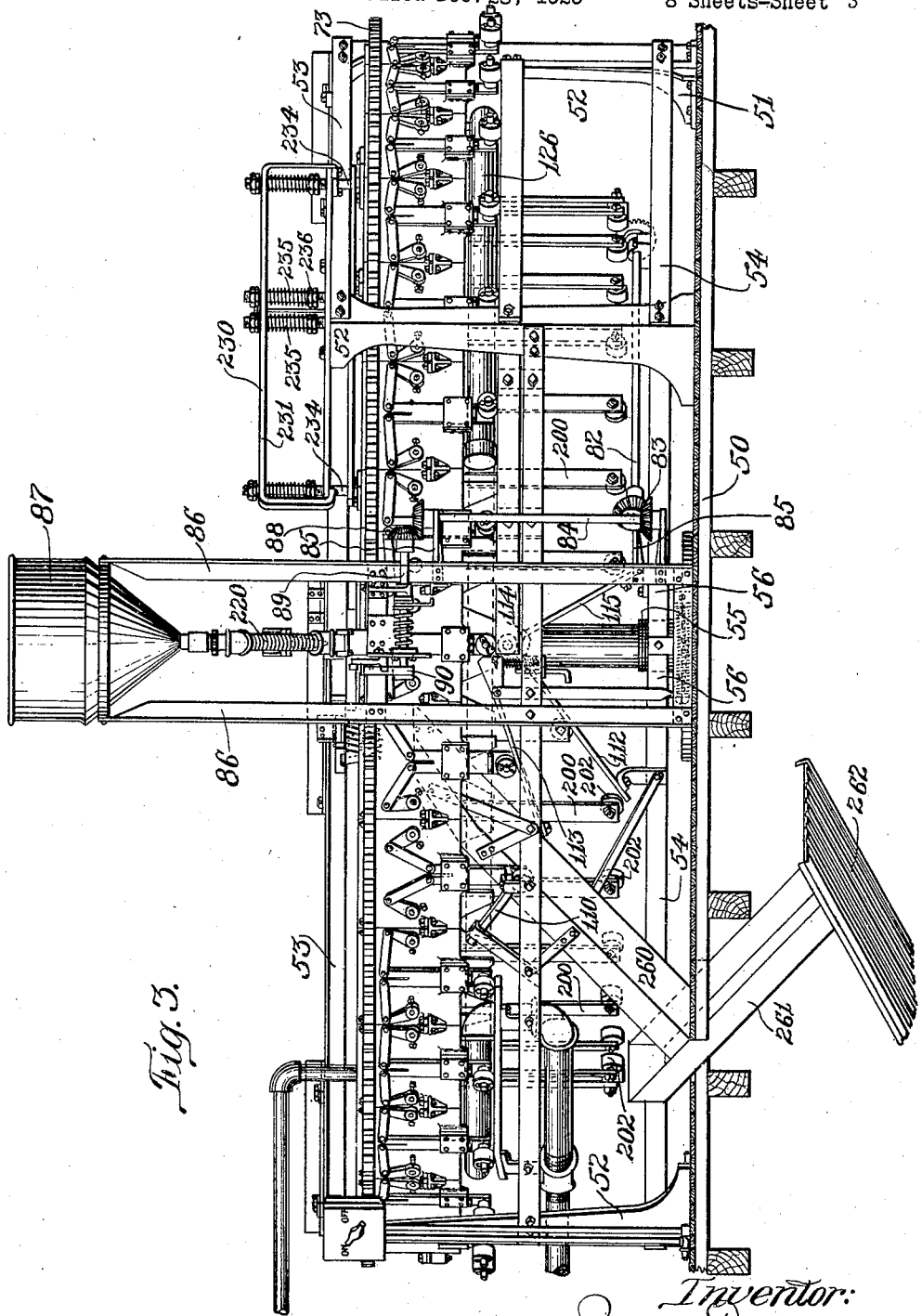

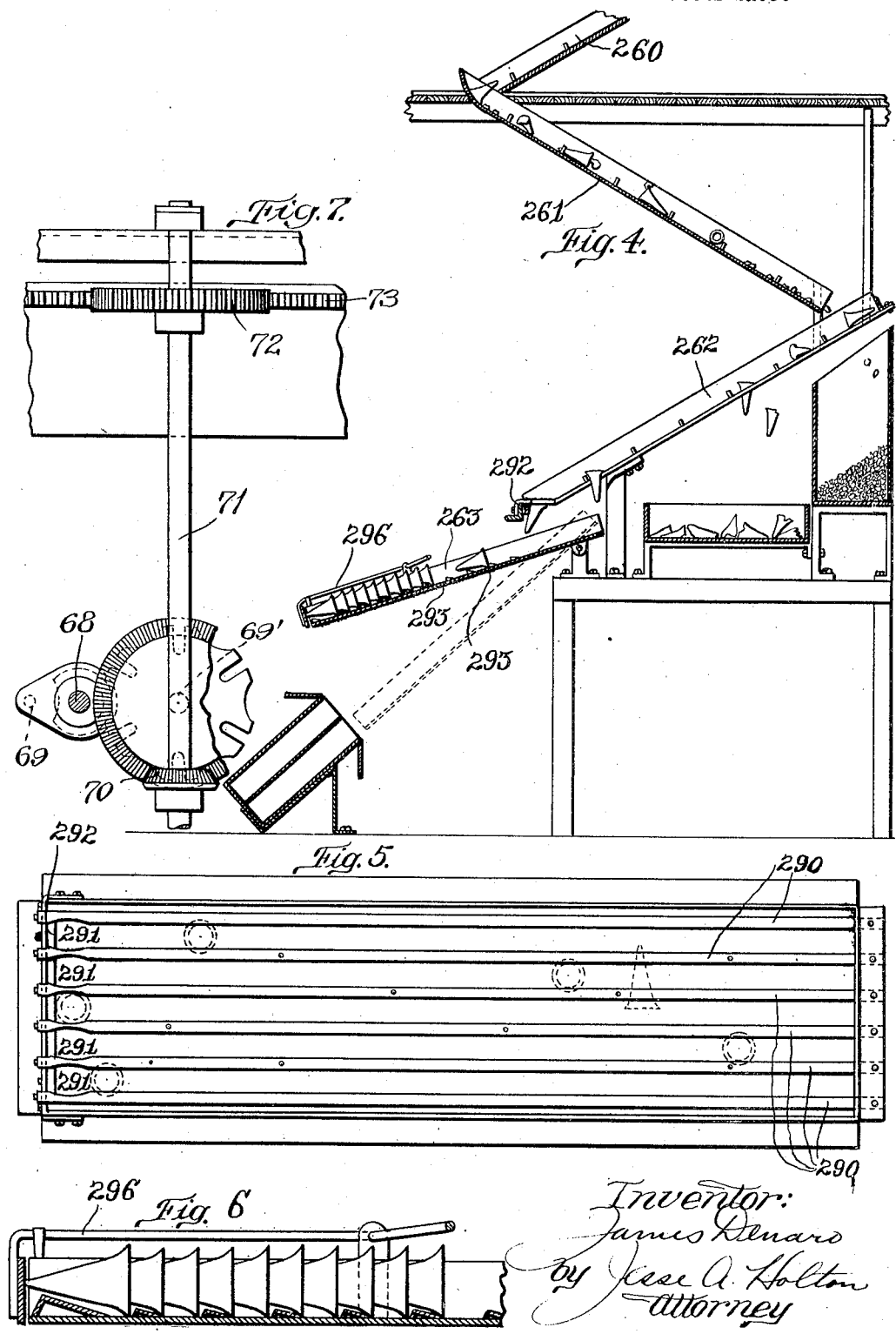

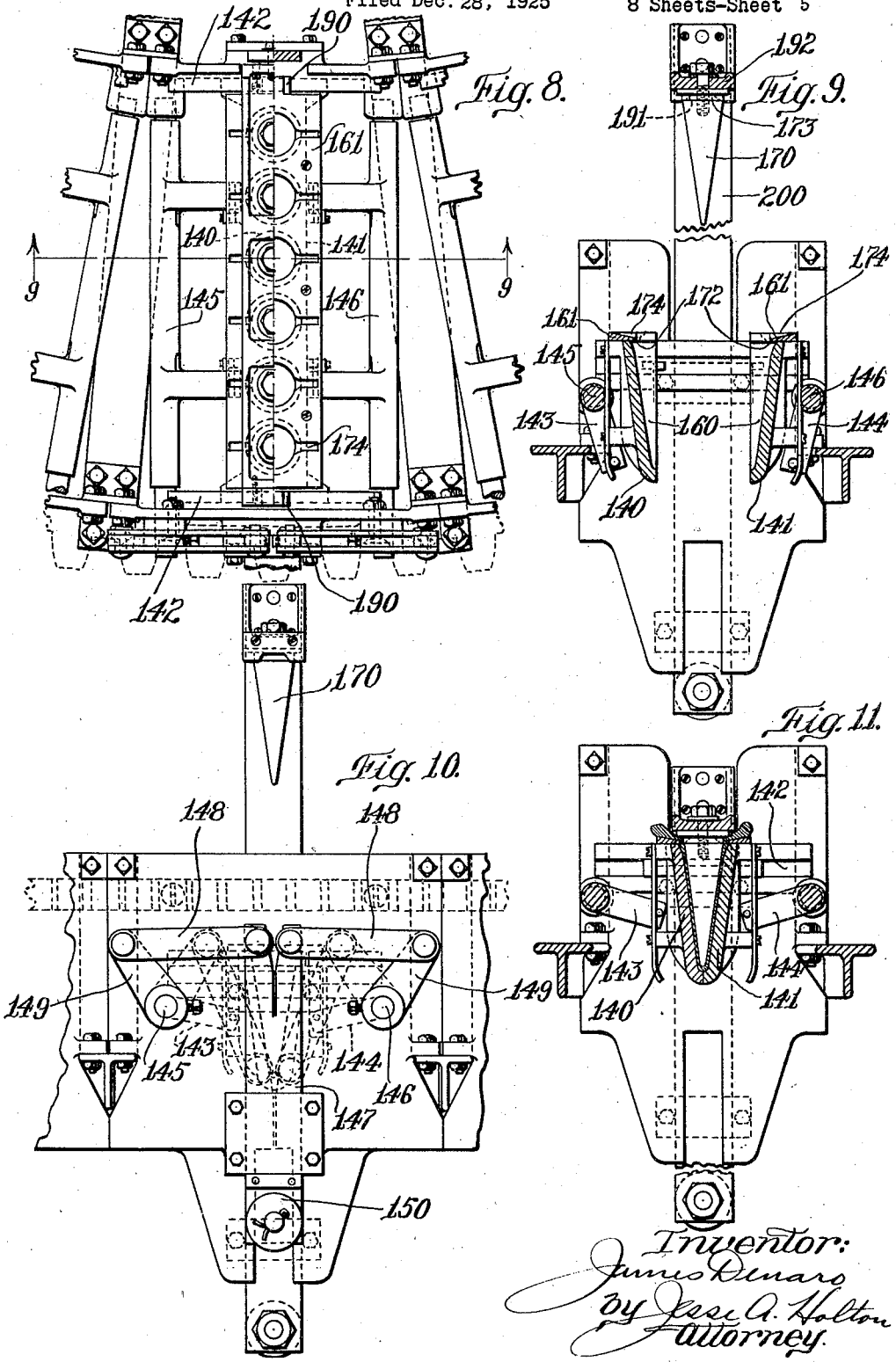

Jan. 25, 1927. 1,615,799
J. DENARO
AUTOMATIC MACHINE FOR MAKING CUP PASTRY
Filed Dec. 28, 1925 8 Sheets-Sheet 6
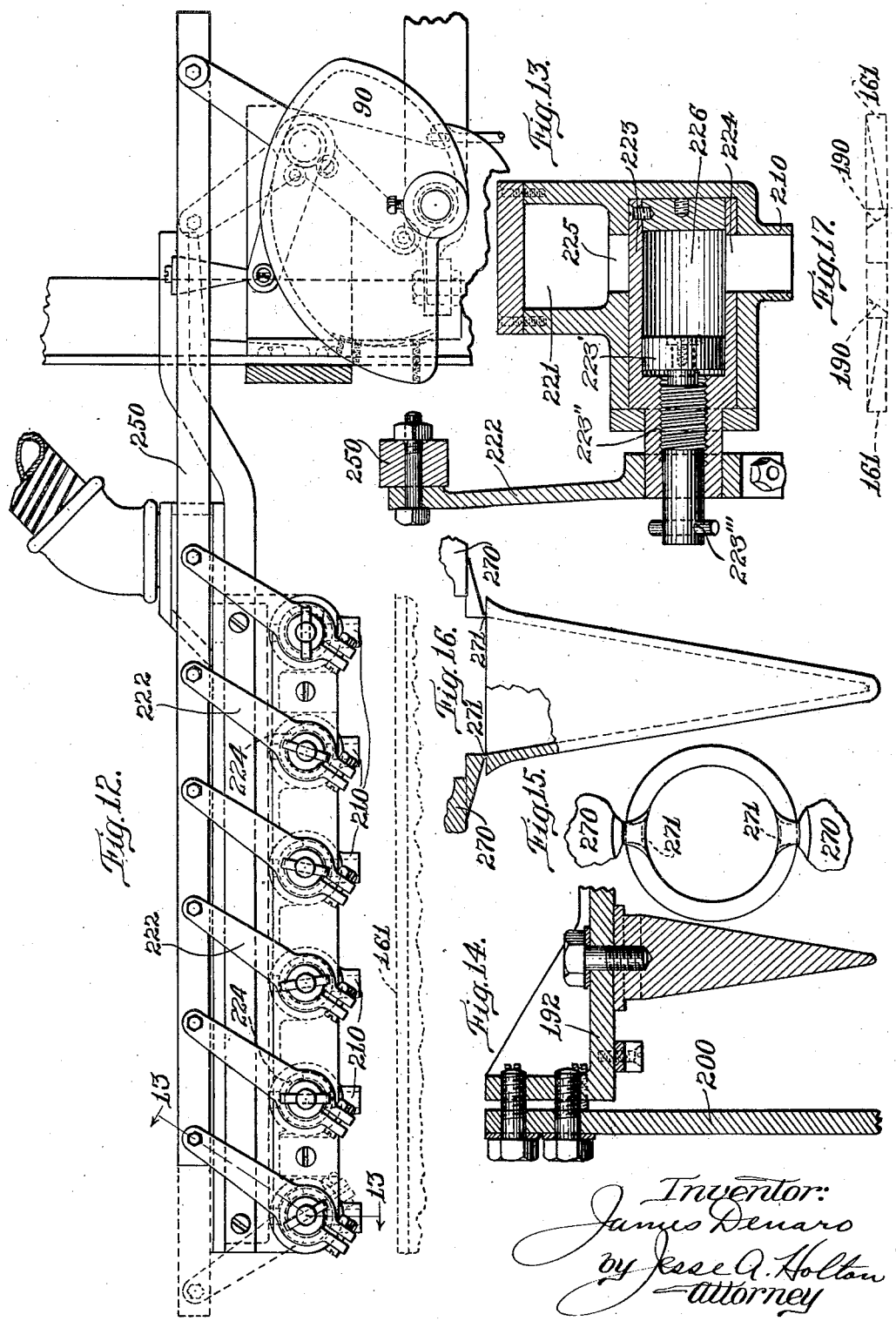

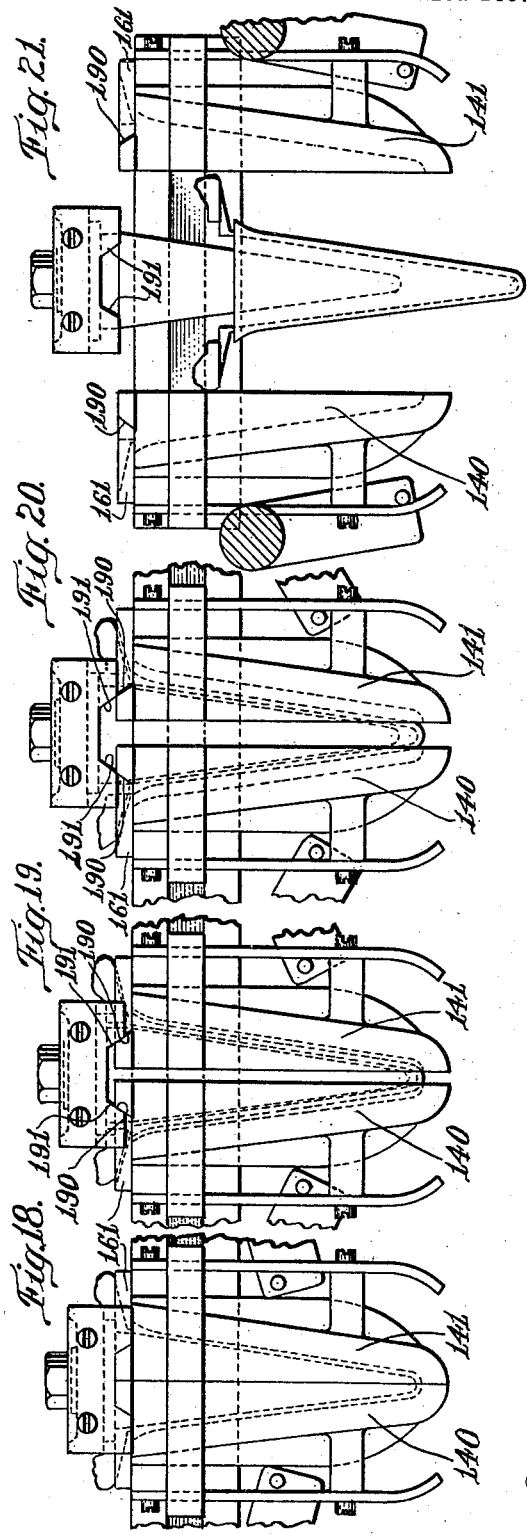
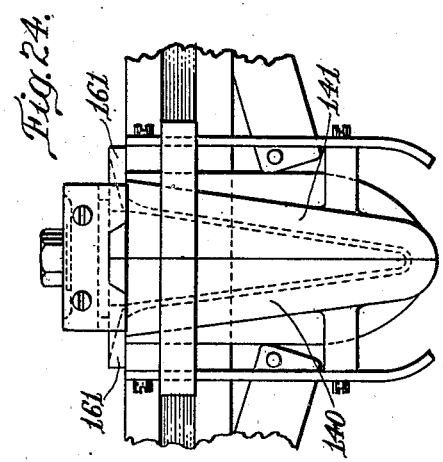
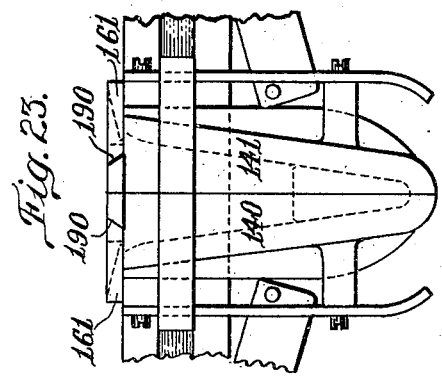
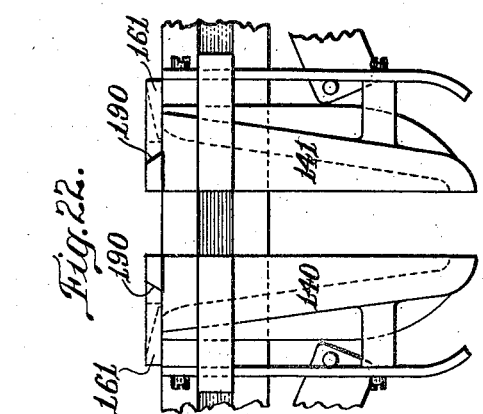

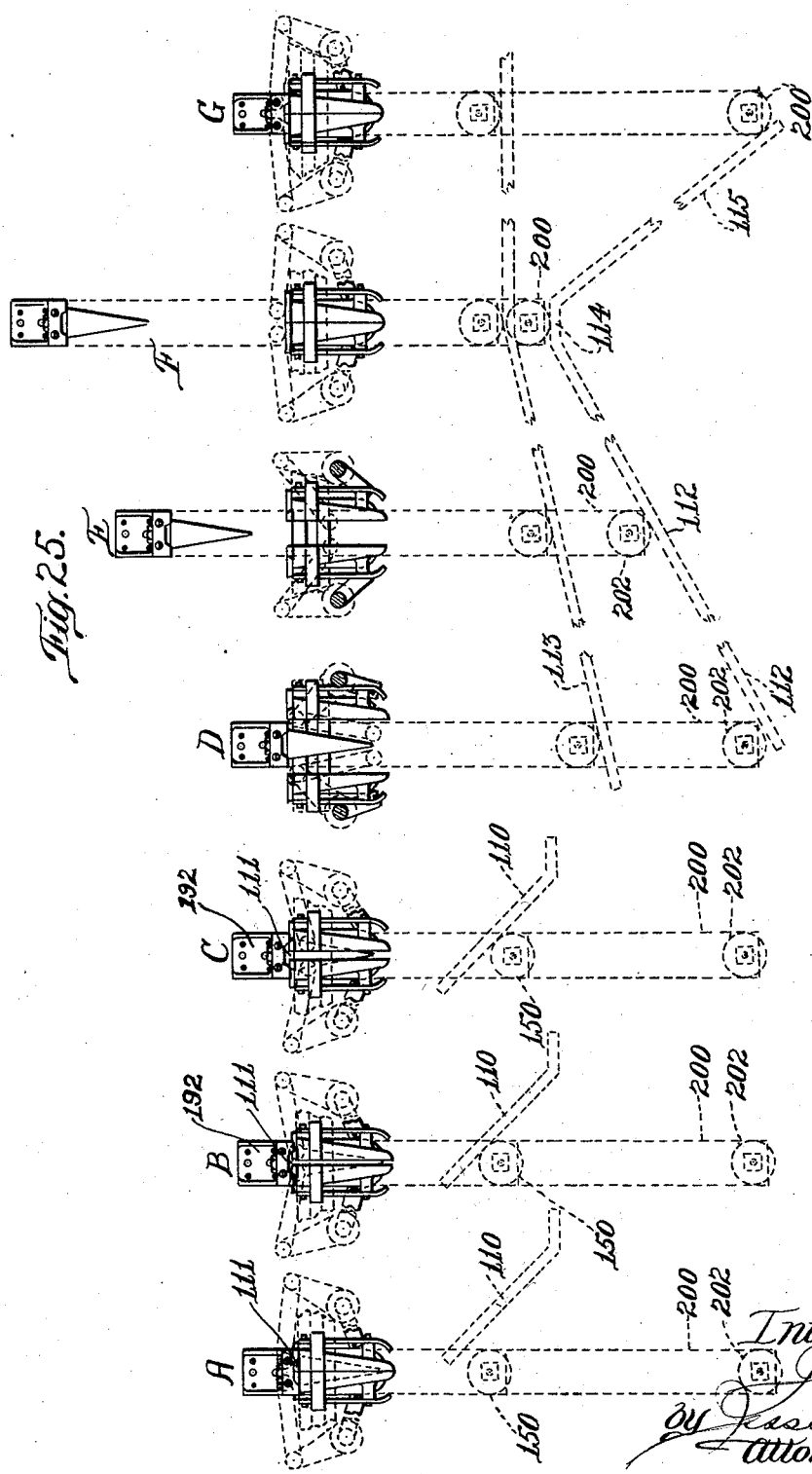

Patented Jan. 25, 1927.

1,615,799

UNITED STATES PATENT OFFICE.

JAMES DENARO, OF CAMBRIDGE, MASSACHUSETTS.

AUTOMATIC MACHINE FOR MAKING CUP PASTRY.

Application filed December 28, 1925. Serial No. 77,910.

This invention relates to automatic machines for making pastry cups, cones and similar articles, and with regard to certain more specific features thereof, to an extraction mechanism by means of which the baked cups or cones are effectively loosened and discharged from the machine at the proper time.

The invention has for one of its principal objects the provision of simple, extremely inexpensive and reliably operative means for insuring the simultaneous opening of all the molding elements whereby the same are effectively broken away from the molded product in order to permit the molded product to leave the machine or be carried by a conveying mechanism to a stacker or a packing device.

Another object of the invention is to provide molding units of simple and inexpensive construction which bakes uniform cones with finished top edges eliminating the necessity of a trimming mechanism.

Another object is to provide means for controlling the action of the batter in the molds under conditions arising from the insertion of the cores and the application of heat, so regulating the expansion of the batter as to form the overflow in a unit with the cone but joined thereto by a slight connection which breaks readily when the cone is dropped leaving no defect in the top of the cone.

Numerous difficulties have existed for a number of years in connection with the extraction or discharge of baked pastry products from so-called automatic machines for molding them. These difficulties have been overcome in a fashion by the use of split female molds such as are commonly used for the molding of glass and other plastic or semi-plastic materials, and the automatic manipulation of either the male or female elements prior to or subsequent to the manipulation of the opposed elements, whereby one or the other of these elements has been later used to assist in the extraction operation. Separate stripper plates have been provided but found unsatisfactory for numerous reasons. Machines have been provided wherein the male core element has been slightly lifted prior to the opening of the female mold element so that when the latter opened the male element will serve as a finger to strip the baked article from the walls of the female elements. Experience has proven that this requires a fine gauge of lift and the operation has been unsatisfactory where the lift is too slight or too great. Usually separate means are employed in the opening of the female elements and the lifting of the male element respectively, and it has been extremely difficult to maintain the nicety of adjustment required to cause simultaneous movement of the molding elements. Variance in casting and machining the mold elements, lost motion, uneven wear of the parts of the machine, settling of the frame structure, and other causes have made it practically impossible to secure and maintain an arrangement of the parts and an adjustment of the cams operating the parts which would operate to continuously extract the baked products.

In the accompanying drawings wherein is represented one of various possible embodiments of the invention:—

Figure 1 is a plan view of one half of the machine.

Figure 2 is a plan view of the other half of the machine.

Figure 3 is a view in elevation.

Figures 4, 5, and 6 are views of the mechanism for conveying and nesting the baked cones.

Figure 7 is a view in elevation of the Geneva movement operating mechanism for the rotatable frame.

Figure 8 is a plan view of the molding devices and operating means therefor.

Figure 9 is an elevational view, partly in section, of the molding devices and operating means therefor, showing the female molds in open position and the core in raised position.

Figure 10 is an elevational view of the molding devices and operating means therefor showing the molds in closed position and the core raised.

Figure 11 is an elevational view, partly in section, of the molding devices and operating means therefor showing the molds in closed position and the core seated down in the closed molds.

Figure 12 is an elevational view showing the pump and operating mechanism therefor.

Figure 13 is an enlarged sectional view taken on the line 13—13 of Figure 12.

Figure 14 is a sectional view of one end of a core bar with a single core attached.

Figures 15 and 16 are respectively a plan view and a side elevation of a cone as discharged from the machine.

Figure 17 is a diagrammatic view of an improved form of top plate for the female molds.

Figures 18 to 24 inclusive show the molding units in different stages of opening and closing.

Figure 25 (sketches A to G inclusive) is a diagram showing the molding units in different positions assumed during the discharging and re-filling operations, and the cams and other devices for effecting these movements.

Referring more particularly to the drawings wherein similar reference characters refer to similar parts throughout the several views, there is erected on a substantial flooring 50 (Fig. 3) a rectangular frame 51, composed of upright corner posts 52 and up horizontal cross ties 53, and lower horizontal cross ties 54. There is a central spindle 55 connected to the corner posts by diagonal braces 56. On this spindle is mounted a large rotating wheel composed of a plurality of molding devices which will be described hereinafter in more detail. The wheel frame is in the form of a spider as shown clearly in Figures 1 and 2 of the drawings, and this spider has a central hub 60 and shaft 61 in order that the wheel may have upper and lower journals in bearings 62 and 55 respectively. A small electric motor 65 mounted on the flooring (see Figure 1) drives a shaft 66 which in turn through boxed-in reducing gearing 67 rotates a shaft 68 at a comparatively low speed. On the shaft 68 is a Geneva movement pin 69 which is adapted to impart periodic rotary impulses to a short shaft 69' journaled in the main frame. Through a bevelled gear and pinion indicated at 70 a shaft 71 carrying a gear 72 is rotated to transmit rotary movement to the large wheel carrying the molding devices by engagement of the gear 72 with a large gear 73 which constitutes the outer circumference of the wheel. This mechanism transmits periodic rotary impulses to the molding units comprised by the wheel.

From the shaft 68 there is a drive through a universal coupling 80 and a bevelled gearing 81 to a shaft 82 which in turn through a bevelled gear 83 drives a vertically disposed shaft 84 suitably journaled in brackets 85. These brackets extend upon and are supported by one of a pair of uprights 86 rigidly connected to the main frame and serving as a support for a batter tank 87. (See Figure 3.) The shaft 84 is connected through a bevelled gearing 88 to a shaft 89 which carries a cam 90 for operating the batter pump which will be described later.

Supported by the fixed frame construction hereinbefore described preferably by suspension from the upper frame structure is a circular oven plate 100. This plate extends approximately 270 degrees of the complete circumference of the rotatable wheel and is arranged directly above the molding units so as to confine the heat.

The actuating cams for the cores and female molds are shown in Figures 3 and 25. These comprise a cam 110 fixed to the frame of the machine and adapted to break open the female mold units. As will be more particularly pointed out hereinafter, there is a cam member 111 formed on the top of the female molds to cause the core to break upwardly at exactly the same time that the mold sections are caused to break open by the cam 110. A cam 112 fixed to the frame of the machine is used to lift the cores out of the molds so that they may hurdle the discharge mechanism of the batter supply pump. A cam 113 fixed to the frame of the machine operates to bring the female mold sections which have been opened by the cam 110, back to their positions of closure ready to receive a charge of batter. The core operating cam 112 comes up to a peak 114 at which time the core is entirely out of the mold and over the batter supply pump. The cam 112 then declines as indicated at 115 to allow the cores to descend again into the closed female molds.

A gas supply main is indicated in Figure 2 at 120 which divides at 121 into a lower gas feed pipe 122 controlled by a valve 123 and an upper gas feed pipe 124 controlled by a valve 125. The upper feed pipe distributes downwardly on to the closed mold units as they pass around the frame under the oven plate 100. The lower gas feed distributes through a conduit 126 to a series of feed pipes spaced apart about the distance from the center of one molding unit to the center of the next molding unit. By this means an even distribution of gas is effected at the top and bottom of the closed molding units as they proceed in their rotary path around the machine below the oven plate 100.

The rotary wheel or spider is made up of sectional inner and outer walls as shown in Figure 2 at 130 and 131 respectively. The walls of each section are joined to the next unit as indicated at 132. Radial arms 133 which go to make up the spider frame extend through apertures in the inner walls 130 at their points of joinder and also extend through and are connected to the outer walls, 131, so that the frame of the rotary wheel is fundamentally composed of the hub 60, the radial arms 133 and inner and outer vertical plates 130 and 131. These plates form a channel all the way around the rotatable frame, and in this channel there are slidably mounted the female mold units 140 and 141.

Referring now to Figures 8, 9, 10 and 11 of the drawings, the female mold units 140 and 141 will be seen mounted in slideways 142 provided on the inner and outer plates 130 and 131. This permits the mold sections to be opened and closed in parallel fashion by rocker arms 143 and 144 on rock shafts 145 and 146 operated from a slide 147 mounted in ways provided on the outer plate 131. The connections from the slide 147 to the rock shafts is through links 148 and levers 149. At the end of the slide there is a roller 150 which at the proper time comes into engagement with cam 110 to open the molds and later into engagement with cam 113 to bring the molds back to their closed position.

The female mold units 140 and 141 are formed with a series of half conical molding recesses 160 so that when brought to closed position a full cone-shaped mold is provided. At the top of each female mold section there is attached a plate 161 and this plate has several important functions. As one views the present invention, those skilled in the art will be familiar with the problems presented by the pressure which is generated by the steam which follows from supplying liquid batter to a hot mold. As the male cores indicated at 170 are brought down into the batter in the closed molds and start on their journey around the frame, the force of the escaping steam unless compensated for or neutralized in some manner will react against the core to push it out of the mold. In order to secure uniform shapes of cones especially at the top edge, it is highly desirable that this difficulty be overcome. The present invention solves this problem in a very efficient manner, and is especially advantageous in producing cones which do not need to be trimmed. To these ends the mold plates 161 are provided with lips 172 which when the female mold units are closed form an overhang flange into which fits a short cylindrical portion 173 at the top of the core. The plates 161 are provided with diametrically opposed recesses 174 slanting inwardly toward the inner edge of the lips 172. Where the recess 174 strikes into the inner edge of the lip 172, the lip is cut back just a few hundredths of an inch to provide a steam vent in each female mold section. The result of this construction is that when the batter is introduced and the core caused to descend into the mold, the batter will be caused to rise up and fill the cavity between the core and the closed mold sections. The process of steam generation starts immediately inasmuch as the mold units are always hot. This will cause a slight overflow of the batter under the force of the steam. This overflow, however, is confined to a narrow strip of batter which works out on either side of the cone between the core and the mold sections, and forms a slight ribbon in the grooves or recesses 174. Sometimes the batter will work out beyond the recesses, but this is of no consequence. The important point to note is that when the cone has been baked and is discharged from the molds, this overflow ribbon has such a slight connection with the main body of the cone at the top inner edge thereof, that the mere dropping of the baked cones into a discharge chute will cause the overflow ribbons to break off along a fine line, leaving no disagreeable appearances of a break. (See Figs. 15 and 16.)

The top mold plates 161 have another aspect of importance. They cover a series of six cavities more or less, on each half mold. At the extremities of the plates 161 there are formed cam faces 190 which are adapted to be in contact with corresponding cam faces 191 formed on the underside of the core bar at 192 which carries a series of six cores 170. When the molding units are in their baking position, the core down in the mold with its short cylindrical portion 173 registered opposite the lip 172, the oppositely disposed cam faces 191 on the bottom of the core bar are in registration or contact with the cam faces 190 on the top plate 161. By this means a very effective discharge of the baked cone is obtained, and these cams are designed particularly for use in a machine which has female mold units separable in parallelism.

As the molding units approach the position of discharge (position B, Figure 25) the cam roller 150 is engaged by the cam track 110 and urged downwardly thereby breaking open the female mold units. In order to insure the separation of the core at the same time that the mold units are broken apart the cammed association between the core bar and the molding top plates has been provided. It will be obvious that it is impossible to break the mold units apart without causing a corresponding relative vertical movement between the core and the molds. The cone being now loosened from all three molding element, it is ready to drop out of the molds when they have been sufficiently opened by the cam 110 to permit the passage of the cone. This takes place at or about the position illustrated by D in Figure 25.

The core bars 192 are mounted on slides 200 (see Figure 14) which are in turn arranged for up and down sliding movement on the inner plates 130 as indicated in Figure 2 at 201. At the lower end of each slide there is a roller 202 which as the molding unit approaches the position for batter supply is engaged by cam track 112. As the slide is lifted to its uppermost position the core is directly over the batter supply mechanism, and it is at this point in the operation of the machine that the pump shown in Figure 12 of the drawings is operated by the cam 90 into the dotted position as shown in said figure, releasing a predetermined amount of batter from each one of the nozzles 210, dropping the same directly into the mold cavities formed by the closed half mold sections directly below the nozzles. From the batter supply tank 87 the batter flows through a conduit 220 to a chamber 221 (see Figure 13) and is there maintained in body until the cam 90 actuates the levers 222 to rotate the hollow plug 223 registering a port 224 thereof with a port 225 in the chamber 221. Gravity flow of the batter then fills the chamber 226 of the valve plug so that as the levers 222 are operated in the reverse direction, the batter will be discharged to the molds through a port 224′ and the nozzles 210. The timing of this valve mechanism can be as desired, as for example, better results might be obtained by throwing the levers 222 as one mold unit leaves the position of registration with the pump so that the chambers 226 may be slowly filling as the next succeeding mold units are moving into position of registration. This, however, it will be readily understood, is a matter of choice in timing.

The hollow plug 223 is provided with an adjustable plunger 223′ which has threaded engagement with the plug as indicated at 223″ and may be adjusted in order to increase or decrease the capacity of the hollow plug by operating a handle 223‴.

To prevent the core bars from rising out of the molds under the influence of the generated steam, a pressure device is arranged on the fixed frame, and this is indicated generally at 230 in Figures 2 and 3 of the drawings. This device comprises a sub-frame 231 and four series of spaced rollers 232. The rollers are journaled in rails 233 which in turn are fixed to rods 234 loosely mounted in the sub-frame structure 231. Springs 235 bear upon adjusting nuts 236 on the rods 234, and these springs react against the sub-frame 231 to press the roller frame down toward the path of the closed mold elements. This device is in no sense a locking device as it is not desirable to lock the cores in the molds. It is merely a resisting mechanism having the effect of preventing the cores from rising out of the molds under the influence of the steam. Preferably this spring mechanism extends for a distance of about three mold units and is arranged on the fixed frame of the machine so that it becomes effective about two stations beyond the filling or batter supply station. In watching the action of the machine, it will be obvious that after the cores have been lowered into the molds the batter begins to emanate and small ribbons will be seen passing out of the recesses 174 previously described. The action of the batter and steam tends to push the core away slightly, but this is compensated for by the pressure device when the molding unit passes below. After about three stations of travel the molding unit passes beyond the pressure device and thereafter, remains in the mold by gravity.

The operation of the machine is as follows:—

The gas burners are ignited and the machine set in operation by turning the switch shown in Fig. 3 which energizes the electric motor 65. Through the gearing and shafting described the mold carrying wheel with attached core slides is rotated step-by-step and the cam for actuating the batter delivery mechanism is given a continuous rotation timed to the step movement of the wheel. Suitable clutch mechanism is interposed in the connections to the cam so that the wheel may be rotated for a period of time without delivering batter. This provides for a preliminary and thorough heating of the molding units before starting the actual baking operation.

When the machine has been heated the batter supply mechanism is connected and the full automatic operation commences. Starting with one mold unit as it passes from position E to position F (Fig. 25) the cam 90 actuates a bar 250 to rotate the levers 222 and cause registration of the plug ports of the filler. This allows the plugs to fill with batter before the machine assumes a rest position so that the return movement of the levers 222 effected by a spring, registers the plug ports with the discharge nozzles 210 and drops a predetermined amount of batter into the closed female molds.

The machine then moves a step during which the roller 200 of the core-carrying slide descends along the cam rail 115 depositing the set of male cores in the closed female sections and urging the batter upwardly to the inwardly projecting lips 172 of the top plates 161. This fills with batter the cavity formed by the walls of the male and female molds and the top plates, which batter, on account of the heat of the molding units, begins at once to expand and flow through the small slots formed by the intersection of the recesses 174 with the inner walls of the lips 172. The result is a slight ribbon of batter flowing from each side of each cone of batter. These ribbons may expand as they pass through and beyond the slots 174 but the connection with the cone body is always maintained as a cross section of a ribbon. The machine then moves on a few steps under the presser until the expansive effects of the heat are largely overcome.

During this period in the operation there is a teetering action of the cores until the moisture is largely dried out of the batter and the cores set by gravity in baking position in the molds. Further rotation of the wheel carries the molding unit into the baking oven where the batter is thoroughly baked in cone form, and the unit later emerges from the oven and approaches the position of discharge.

Position A. B. C. and D in Figs. 18 to 23 and 25 illustrate the discharging operation. At A in Fig. 25 the parts are in baking position the roller 150 of the mold opening and closing slide not having engaged the cam 110. As the mold unit leaves this position and moves to the next position of rest it passes through the positions illustrated by B and C. on to position D which is the one where the cones drop to the conveyor chute 260 for delivery to the floor below by a series of slides 261, 262 and 263. Contact of the roller 150 of the mold opening slide with fixed cam 110 causes the female molds to break open and as they break, the engagement of cam faces 190 of the top plates 161 with cam faces 191 of the core bar causes simultaneous upward movement of the cores. This results in a cracking of all the active walls of the molding elements away from the baked product and a thorough loosening of the cones from all the metal parts so that as the unit finishes its step of movement with the female molds fully open the cones will drop to the conveyor chute.

As the female molds pass in their opening movement, from under the core bar the roller 202 of the core carrying slide 200 comes into position over the cam rail 112 thus preventing downward movement of the core bar.

The next position of movement is as illustrated by E in Fig. 25 with the cores partly elevated by the cam 112 and the molds partly closed by the cam 113. The wheel then moves to position F in Fig. 25 where the cores are fully elevated by the cam 112 and the molds are fully closed by the cam 113. This completes the cycle of machine operation.

The conveyor 260 is suitably below the mold units to allow the cones a slight drop sufficient to jar off the overflow fins shown at 270 in Figs. 15 and 16. The breaks occur at the inner edge of the top of the cone along the lines 271 and are even and sightly. The result, due in large part to the top plate and its recessed formation, is a flat even top edge on a cone of uniform thickness and excellent appearance. The top plates when closed form a registration aperture for the cores, a short cylindrical portion 280 of the core fitting the inner edge of the lip 172 of the plate. The plates thus centralize the cores in the molds, form the top edges of the cones, provide for expansion and overflow of the batter in a form which breaks off without necessity of handling or trimming and insure the cracking of the molds and cores away from the baked product.

As the cones slide by gravity along the chute 260 they pass to the reverse direction chute 261 and slide thereon in more or less haphazard fashion. They then drop to a chute 262 of special construction as shown in Fig. 5. This chute comprises a series of spaced rails 290 allowing the points of the cones to fall between the rails while the top edges of the cones are not permitted to pass. This causes the cones to assume vertical positions and to drop in these positions through the enlargements 291 at the bottom of the chute. A trip bar 292 is provided at the lower end of the chute so that as the cones hit at their top edges their points will be deflected forwardly. The cones then drop to a channelled chute 263 with spaced projections 293 which periodically deflects the cone point upwardly for the purpose of insuring the nesting of the successively arriving cones. After the cones are nested in suitable quantity the chute 263 is moved into registration with a carton and the arresting plate 295 at the lower end of the chute moved by a lever 296 to allow the stack of nested cones to slide into the carton.

Having described the invention, what I claim is,—

1. In a machine for baking pastry containers a core head carrying a plurality of cores, a pair of female molds adapted to be associated in closed position with the core head for the baking of pastry, means for separating the female molds in parallelism and means controlled by the separation of the female molds for moving the core carrier.

2. In a machine for baking pastry containers a core head carrying a plurality of cores, a pair of female mold sections movable into closed position to receive the cores and movable away from each other in parallelism to permit the baked product to drop out, means for effecting such movements of the female mold elements and means for insuring a movement of the core head in a line at right angles to the line of movement of the female mold elements, and simultaneously with the movement of the latter.

3. In a machine for baking pastry containers, a core carrying head, split molds, means for moving the split molds in parallelism away from each other, and cam means causing inter-engagement of the core carrying head and the split molds when in closed position to effect both lateral and longitudinal registration of the molds and head and adapted to transmit motion to the core carrying head upon opening of the molds.

4. In a machine for baking pastry containers, a core, a divided female mold, means for moving both parts of the female mold in opposite directions transversely of the core axis to open the female mold, and means under the control of the first said means for causing a simultaneous upward movement of the core.

5. In a machine for baking pastry containers, a core, a divided female mold, means for relatively separating both parts of the female mold transversely of the core axis, means under the control of the separating means of the mold parts for causing a movement of the core away from the molds, and another means for causing a greater movement of the core away from said mold.

6. In a machine for baking pastry containers, divided female molds movable into closed and opened positions, cavities in each mold registering in the closed position to form a cup, a lip at the top of each cavity adapted to form the top finished edge of the cup and a small cutaway in the lip providing for the passage of batter between the lip and a core, and a male core movable into and out of the cup cavity formed by the closed molds.

7. In a machine for baking pastry containers, split molds and cores therefore, means for supplying batter to the molds, means for baking the batter in the molds, and means for loosening the baked product from the molds and cores, comprising inwardly projecting lips at the tops of the molds and cams for causing an upward movement of the cores as the split molds commence to separate.

8. In a machine for baking pastry containers, split molds, cores and a stripper plate having provision for forming the top finished edge of the container and also having provision for letting the batter overflow in a ribbon between the plate and the cores.

9. In a machine for baking pastry containers, a female mold section having a top providing a lip projecting inwardly, another mold section having a similar top, means for moving the mold sections together to form a batter receiving cup and a part to allow a finished product to drop between the sections, means for supplying a measured quantity of batter to the cup formed by the molds, a core movable into the cup, means for baking the batter, and means on the mold sections cooperative with means fixed to the core for simultaneously moving the core upwardly as the split molds commence to move apart.

10. In a machine for baking pastry containers, a plate for a female mold top adapted to form the top finished edge of the container, said plate comprising a channel and a portion recessed from one edge to allow a thin ribbon of batter to overflow from the mold.

11. In a machine for baking pastry containers, a chute for conveying the baked containers from the machine, the chute comprising means for sorting the containers into rows and positioning the containers so they will drop from the chute successively in the same position.

12. In a machine for making and packing cup-shaped containers, a chute having means for sorting the containers into rows and delivering them from the chute with their corresponding ends uniformly foremost and another chute adapted to receive the containers keep the same end foremost and telescope the containers to form a stack.

13. In a machine for making and packing cup shaped pastry containers, molding devices for receiving and forming batter, means for supplying a measured quantity of batter to the molding devices, means for baking the batter in the molding devices, means for discharging the baked product, means for conveying the discharged containers to a nesting device, said conveying means having provision for automatically sorting the containers and positioning the same with corresponding ends uniformly foremost, and a nesting device adapted to receive the containers and release a stack of them to a packing box.

14. A chute for pastry cones comprising a plurality of spaced ribs inclined toward cutaway portions at the lower end of the chute, the spacing and inclination being such that the cones ride points downwardly between adjacent ribs and pass through the chute at the cutaway portions of the lower end, an arresting bar at the lower end where the cones pass out which acts to deflect the points forwardly as they drop, and another chute for nesting the cones.

15. A chute for pastry cones comprising a plurality of spaced ribs inclined toward cutaway portions at the lower end of the chute, the spacing and inclination being such that the cones ride points downwardly between adjacent ribs and pass through the chute at the cutaway portions of the lower end, means at the lower end for deflecting the cone points forwardly as they drop, and another chute adapted to receive the cones and provided with means for lifting the points to cause nesting.

16. An extraction mechanism for the cup pastries baked between split female molds and a core, comprising a lip at the upper end of the molds for forming the top finished edge of the cup, cam means between the molds and the core whereby the movement of the split molds apart causes simultaneous upward movement of the core, and means for effecting the movement apart of the split molds.

JAMES DENARO.

DISCLAIMER 1,615,799.—*James Denaro*, Cambridge, Mass. AUTOMATIC MACHINE FOR MAKING CUP PASTRY. Patent dated January 25, 1927. Disclaimer filed April 2, 1930, by the patentee.

Hereby enters a disclaimer with respect to claim 7 of said patent of any means for loosening the baked product from the molds and cores other than a means which affects a movement of the female mold elements in parallel relation and in a line substantially at right angles to the axes of the core elements.

Please enter the disclaimer in the following words, i. e.—

In claim 7, line 6, after "comprising" place a comma and insert *devices for separating the split mold sections in parallelism and in a line substantially at right angles to the core axes.*

[*Official Gazette April 22, 1930.*]